(12) United States Patent
Wang et al.

(10) Patent No.: US 10,475,204 B2
(45) Date of Patent: Nov. 12, 2019

(54) FAST MULTI-OBJECT DETECTION AND TRACKING SYSTEM

(71) Applicant: CANON KABUSHIKI KAISHA, Tokyo (JP)

(72) Inventors: Shiting Wang, Beijing (CN); Qi Hu, Beijing (CN); Dongchao Wen, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 214 days.

(21) Appl. No.: 15/689,943

(22) Filed: Aug. 29, 2017

(65) Prior Publication Data
US 2018/0061076 A1 Mar. 1, 2018

(30) Foreign Application Priority Data

Aug. 30, 2016 (CN) .......................... 2016 1 0770737

(51) Int. Cl.
*G06T 7/70* (2017.01)
*G06T 7/20* (2017.01)
*G06K 9/00* (2006.01)

(52) U.S. Cl.
CPC ............... *G06T 7/70* (2017.01); *G06K 9/00* (2013.01); *G06T 7/20* (2013.01); *G06T 2207/20021* (2013.01); *G06T 2207/30196* (2013.01); *G06T 2207/30241* (2013.01)

(58) Field of Classification Search
CPC combination set(s) only.
See application file for complete search history.

(56) References Cited

U.S. PATENT DOCUMENTS

| 8,059,157 B2* | 11/2011 | Kuo | G06T 7/20 348/208.6 |
| 8,213,681 B2* | 7/2012 | Nobori | G06T 7/215 382/103 |
| 8,582,822 B2* | 11/2013 | Iwasaki | G06K 9/00348 382/107 |
| 8,599,252 B2* | 12/2013 | Komoto | G06T 7/215 348/135 |
| 8,634,471 B2* | 1/2014 | Endo | H04N 5/144 375/240.16 |
| 9,569,694 B2* | 2/2017 | Othmezouri | G06K 9/00369 |
| 9,781,382 B2* | 10/2017 | Zhang | H04N 19/527 |
| 10,051,274 B2* | 8/2018 | Kobayashi | H04N 19/176 |
| 10,262,434 B2* | 4/2019 | Lee | G06T 7/73 |

(Continued)

OTHER PUBLICATIONS

Breitenstein, et al., "Online Multi-Person Tracking-by-Detection from a Single, Uncalibrated Camera", IEEE Transactions on Pattern Analysis and Machine Intelligence, Submitted Jan. 2010, Revised Oct. 2010.

*Primary Examiner* — Anand P Bhatnagar
(74) *Attorney, Agent, or Firm* — Canon U.S.A., Inc. IP Division (57) ABSTRACT

The present invention relates to the fast multi-object detection and tracking system. According to the system of the present invention, only a few frames are to be detected and the other frames are split into different size of steady motion segments in a binary way, and then the system of the present invention can predicted accurately. The system can help to achieve high tracking speed with multi-persons in high-definition videos and gain high accuracy as well.

23 Claims, 6 Drawing Sheets

(56) References Cited

U.S. PATENT DOCUMENTS

| | | | | |
|---|---|---|---|---|
| 2010/0134640 A1* | 6/2010 | Kuo | ............................ | G06T 7/20 |
| | | | | 348/208.6 |
| 2011/0091073 A1* | 4/2011 | Iwasaki | .................... | G06T 7/292 |
| | | | | 382/103 |
| 2011/0255747 A1* | 10/2011 | Iwasaki | ............... | G06K 9/00348 |
| | | | | 382/103 |
| 2012/0189167 A1* | 7/2012 | Kurata | .................... | H04N 5/145 |
| | | | | 382/107 |
| 2012/0206597 A1* | 8/2012 | Komoto | ............. | G06K 9/00805 |
| | | | | 348/135 |
| 2013/0022123 A1* | 1/2013 | Ueda | ....................... | H04N 19/52 |
| | | | | 375/240.16 |
| 2016/0117571 A1* | 4/2016 | Othmezouri | ........ | G06K 9/00369 |
| | | | | 382/165 |

* cited by examiner

FAST MULTI-OBJECT DETECTION AND TRACKING SYSTEM

CROSS REFERENCE TO RELATED APPLICATIONS

This application claims the benefit of Chinese Patent Application No. 201610770737.0, filed Aug. 30, 2016, which is hereby incorporated by reference herein in its entirety.

TECHNICAL FIELD

The present invention generally relates to a multi-object detection and tracking system.

BACKGROUND

Multi-object detection is one of the most important components in various computer vision applications, such as surveillance, sports video analysis. Thanks to impressive progress in object detection (better feature extraction method such as Histogram of Oriented Gradient and fast cascade classifiers), tracking-by-detection system has been attractive in recent years. However, keeping the accuracy, if the video resolution becomes higher, both the detection and tracking speeds are becoming slower. And most existing systems cannot run at full frame-rate, especially in high definition video or high frequency video.

A paper published in "*IEEE TRANSACTION ON PATTERN ANALYSIS AND MACHINE INTELLIGENCE*" (Michael D. Breitenstein, Fabian Reichlin, et al. *Online Multi-Person Tracking-By-Detection From A Single, Uncalibrated Camera*. Submitted January 2010, revised October 2010), describes a tracking-by-detection method, which is mainly composed of a detector and a data association unit, processing every frame in the image sequence of video, i.e. the method of frame-by-frame detection.

In this method of the paper, as to the frame timestamp t, the human detector (sliding-window based or feature-based, etc.) detects over the whole image to give out detection results, and then the data association unit decides which detection result should guide which trajectory of last tracking results on frame (t−1). Approaches for data association problem could be complex to pursue high accuracy. For example, this reference paper focuses on greedy algorithm and scoring function, considering detector confidence, human position, motion and appearance.

But there is a main problem of the method of the reference paper. That is, frame-by-frame detection on the whole image frame can heavily slow the processing speed, no matter sliding-window style or feature-based style.

For one frame, the bigger the search region for detection, the slower the detection speed. Besides, there are motion coherence between neighbour frames, thus frame-by-frame detection is a huge abuse. These two things both heavily slow the tracking speed, making it far from real-time processing.

Based on the above, there is a need in the art for a system of fast multi-object tracking, which can help to achieve high tracking speed with multi-objects in videos and not lose accuracy as well.

SUMMARY OF THE INVENTION

The present invention provides a tracking-by-detection system, where only a few frames are to be detected. It utilizes the idea of binary search to split frames into segments of different sizes of steady motion for accurate motion prediction. And it can reach over-real time tracking speed and high accuracy at the same time.

An aspect of the present invention provides a multi-object detection and tracking system, comprising:

a preprocess unit which is configured to select a plurality of first sampled frames to divide a sequence of images into frame cells;

a global object detector which is configured to perform object detection on the whole image of the first sampled frames, and give out global detection results;

a frame sampling unit which is configured to select at least one second sampled frame in a frame cell;

a local object detector which is configured to perform object detection on the region-of-interest of the second sampled frames, and output local detection results;

a data association unit which is configured to align the global detection results and the local detection results with existed trajectories by object similarity.

According to the system of the present invention, only a few frames are to be detected and the other frames are split into different size of steady motion segments in a binary way. Different from the frame-by-frame tracking system in the prior art, the present invention proposes a "sampled frame" tracking system which is computationally efficient and achieves high accuracy as well.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

Figure 1:
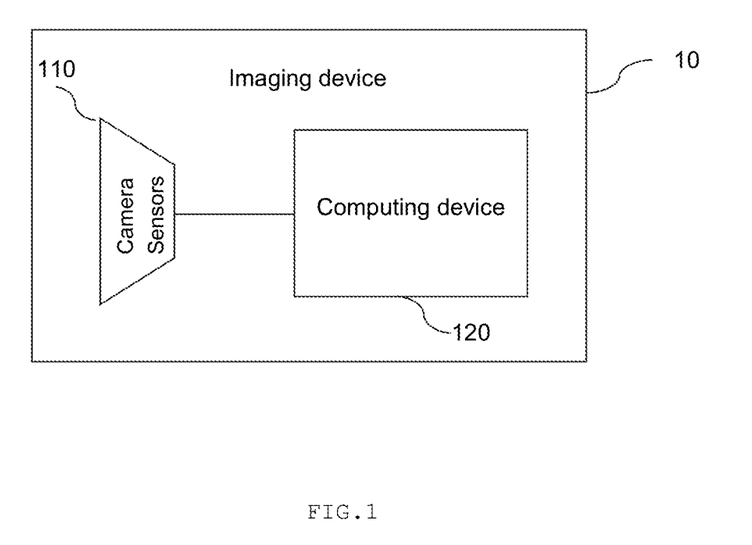
FIG. 1 is a schematic block diagram according to a first exemplary system configuration which can implement the embodiments of the present invention.

FIG. 1 is a schematic block diagram according to a first exemplary system configuration which can implement an embodiment of the present invention. An imaging device 10 comprises camera sensors 110 and a connected computing device 120. The camera sensors 110 acquire videos or image sequences. The computing device 120 implements the method of tracking boundary points of an object in a video. The computing device 120 may be in the form of an integrated circuit chip, which is compact and easy to be embedded in the imaging device 10. For example, imaging device 10 may be a handheld camera, a network camera, or a mobile phone with a camera.

Figure 2:
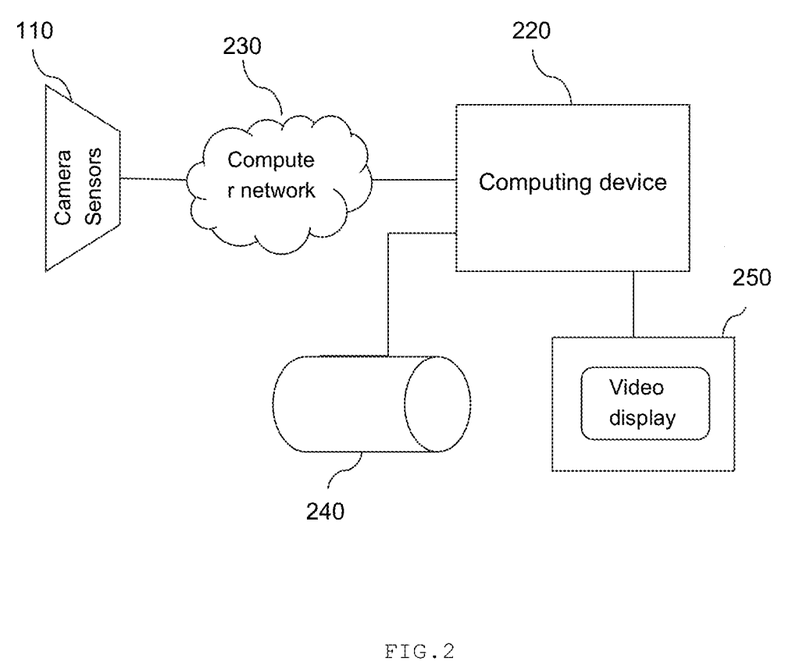
FIG. 2 is a schematic block diagram according to a second exemplary system configuration which can implement the embodiments of the present invention.

FIG. 2 is a schematic block diagram according to a second exemplary system configuration which can implement an embodiment of the present invention. The camera sensors 110 are used to obtain videos or image sequences. Computer network 230 transmits these videos or image sequences to the computing device 220. The computing device 220 implements the method of tracking boundary points of an object in a video. The computing device 220 may be in the form of a local personal computer, a remote server, or a workstation.

Figure 3:
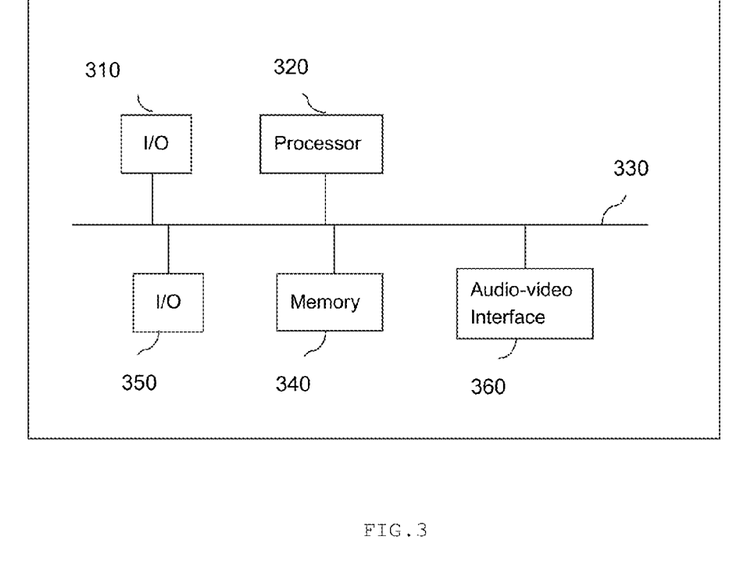
FIG. 3 is block diagram illustrating an exemplary hardware configuration of the computing device 220 in FIG. 1 and FIG. 2.

FIG. 3 is block diagram illustrating an exemplary hardware configuration of the computing device 220 in FIG. 1 and FIG. 2.

The transmission of the images from the camera sensors 110 to the computing device 220 is facilitated by an input/output (I/O) interface 310, which could be a serial bus compliant with Universal Serial Bus (USB) standards and having corresponding USB connectors. The video containing image sequence may also be downloaded from a local storage device 240 that can include SIM cards, SD cards and USB memory cards etc.

The images are obtained by I/O interface 310 and sent to the memory 340. The processor 320 is arranged to retrieve the software program of the disclosed method which is stored in memory 340. The processor 320 is also arranged to fetch, in one embodiment, decode and execute all steps according to the disclosed method, such as flow diagrams illustrated in FIG. 8 and FIG. 9. The processor 320 records the results from the respective operations to memory 340, using system bus 330. Apart from memory 340, the output could also be stored more permanently on a storage device 240, via an I/O interface 350. Alternatively, the output may also be displayed for human viewing, using Audio/Video interface 360, on a monitor 250.

The computing device 220 may be in various forms, such as a processing system embedded in an imaging device in FIG. 1, or a stand-alone computer in FIG. 2, possibly with one or more unnecessary components removed, or with one or more additional components added.

Next, an exemplary embodiment of the method of tracking boundary points of an object in a video is detailed explained.

Figure 4:
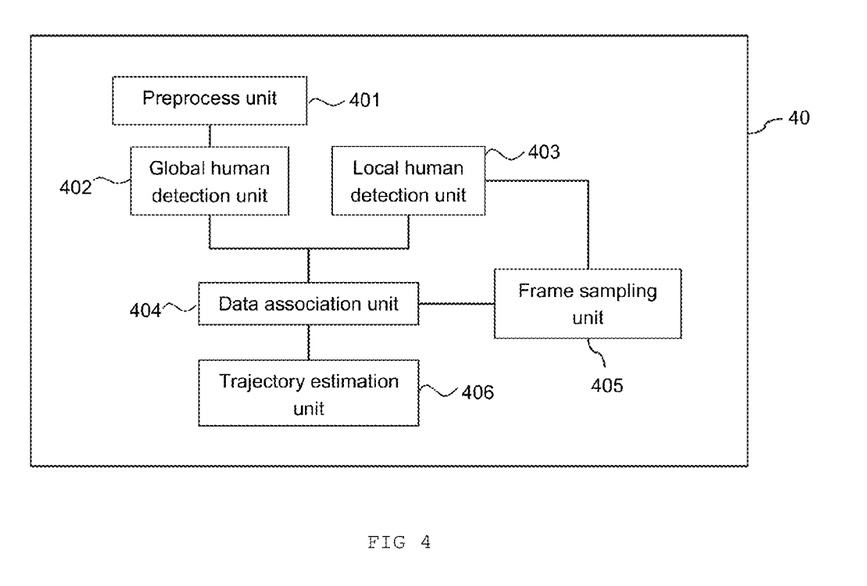
FIG. 4 is a block diagram of the system of object detection and tracking according to an exemplary embodiment of the present invention.

A block diagram of the overall fast object detection and tracking system is shown in FIG. 4. The fast object detection and tracking system 40 basically comprises five units: preprocess unit 401, global human detector 402, local human detector 403, data association unit 404 and frame sampling unit 405. In some embodiments of the present invention, the multi-object detection and tracking system can comprise a trajectory estimation unit 406, which is an optional unit according to the application requirement.

The preprocess unit 401 uniformly selects sampled frames, dividing input image sequence into frame cells. For each frame cell, the global human detector 402 detects over the whole uniformly sampled frame to give out global detection results. The data association unit 404 decides which global detection result guides the existed tracking results or creates new trajectories as tracking results. The frame sampling unit 405 selects sampled frames inside each frame cell in a predetermined way, and utilizes tracking results to decide region-of-interest on the said sampled frames according to motion continuity. The local human detector 403 detects over these region-of-interest to give out local detection results. Meanwhile, data association unit 404 associate both local and global detection results to existed trajectories. In addition, trajectories on the un-sampled frames are estimated by motion according to the existed tracking results.

The detail of the workflow and principle about the corresponding unit will be discussed as follows:

Preprocess Unit

The function of the preprocess unit 401 is to select sampled frames simply and uniformly by uniformly interval N (N is predetermined and N≥1), wherein k is the frame timestamp in whole input image sequences, and k≥1. Thus the preprocess unit 401 may divides input image sequence into frame cells, the schematic diagram of frame cell according to an exemplary embodiment of the present invention is illustrated in FIG. 5.

Figure 5:
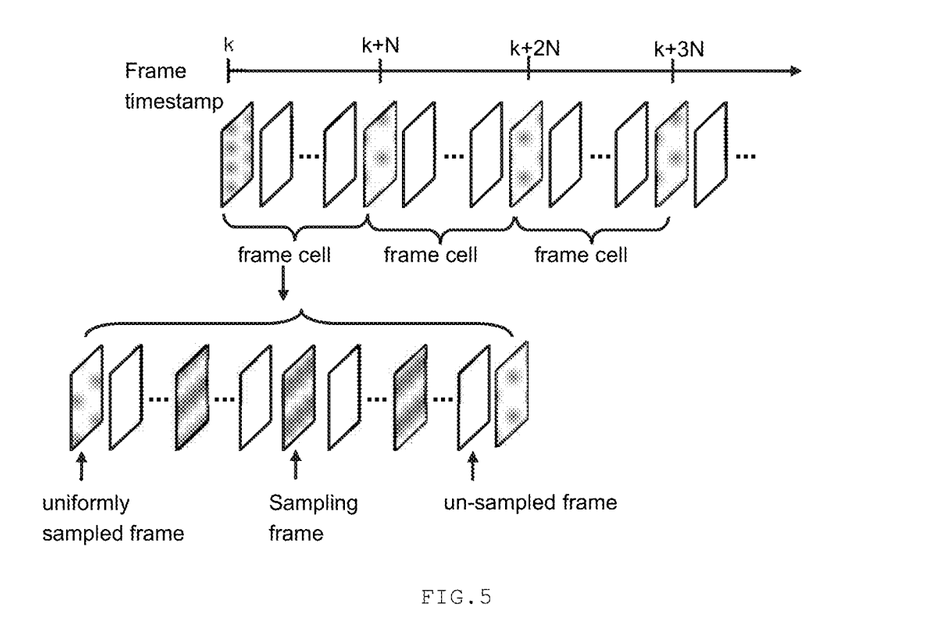
FIG. 5 is a schematic diagram of frame cell according to an exemplary embodiment of the present invention.

In FIG. 5, frames between two uniformly sampled frames are regard as a frame cell. Frames filled with dots in the figure are uniformly sampled every N frames. Sampled frames filled with lines in the figure are chosen inside each frame cell in a predetermined way. The remained frames are called un-sampled frames. Two uniformly sampled frames and frames between them make a frame cell. That is, uniformly sampled frames are shared by neighbor frame cells.

In the present invention, the frame cells are sequentially processed for object tracking.

Global Human Detector

The function of the global human detector 402 is to detect human in an input region. The word "Global" indicates that the input region is whole image of each uniformly sampled frame.

Figure 6:
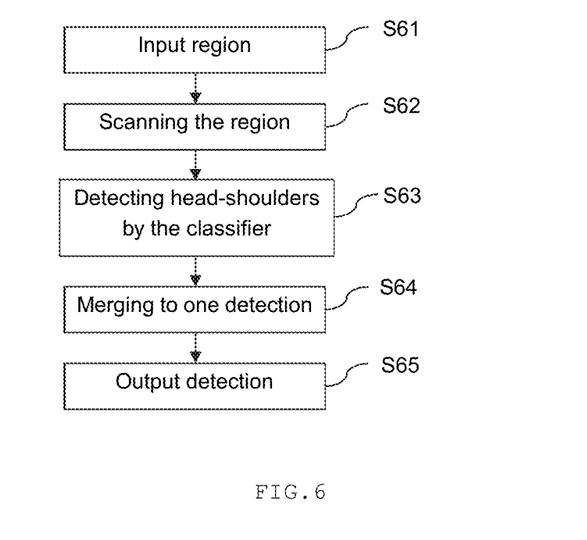
FIG. 6 is a flow diagram of the working principle of the global human detector according to an exemplary embodiment of the present invention.

In some embodiments of the present invention, human head-shoulder is taken as the detection object. The human detector can be sliding-window based or feature-based, etc. FIG. 6 illustrates a flow chart of sliding-window based detector for head-shoulder detection on an input region. The detection method comprises the following steps:

Step S61 inputs data of an input region, then turn to step S62.

Step S62 uses a scan window to do an exhaustive research of possible locations and scales in a region, then turn to step S63.

Step S63 detects head-shoulders by using a head-shoulder classifier, and turn to step S64, which merges the detection positions into a single detection position by averaging their similar locations and sizes. Turn to step S65.

Step S65 outputs the detection results.

The classifier of step S63 comprises a cascade of weak classifiers. The structure of object detector (classifier) is cascaded, where each feature corresponds to a weak classifier, and the final classifier is combined by a cascade of weak classifiers. In some embodiments of the present application, Histogram of Oriented Gradient (HOG) feature and boosting algorithm is used to build classifiers. HOG feature images are obtained by projecting each pixel's gradient magnitude into 8 orientations according to its gradient direction. In some embodiments of the present application, the head-shoulder classifier is trained off-line with hundreds of thousands of positive/negative training samples, which are normalized to the same size.

Local Human Detector

The local human detector 403 can be the same as the global human detector in terms of classifiers. The key differences are their target frames and detect regions. The global detector does detection on whole image of uniformly sampled frames, while the local detector does detection only on region-of-interest (ROI) of a sampled frame output by the frame sampling unit. The word "local" indicates that the input region is ROI of the sampled frame output by the frame sampling unit.

What's more, local detector can have lower threshold for cascade classifiers than that of the global detector. Because ROI utilizes frame-to-frame coherence and has large potential to contain the new position of tracking person, it is reasonable to lower the cascade classifier's threshold to let the candidate detections easier to pass through the classifier, producing higher precision without increasing the false alarm.

Compared to the prior art, the global human detector and the local human detector can dramatically reduce the computation load of human detection:

(1) Compared to the frame-by-frame detection of the prior art, FIG. 5 clearly shows that only a few frames in a frame cell are to be detected on according to an exemplary embodiment of the present invention.

(2) Compared to the whole image detection of the prior art, the predicted region for human is determined by global detection result and motion estimation according to an exemplary embodiment of the present invention. Then ROI is generated by expanding the predicted region. It exploits frame-to-frame coherence and coarsely estimates where to look for potential people. In some embodiments of the present invention, predicted human region and its corresponding ROI in a certain sampled frame output by the frame sampling unit can significantly reduce the number of sliding windows, compared with the whole image.

Data Association Unit

The functions of the data association unit 404 are three kinds as follows:

(1) associating both global detection results and local detection results with existed trajectories. If success, update corresponding trajectories' positions.

(2) creating new trajectories if a global detection result can't be successfully associated.

(3) terminating an existed trajectory if it continuously fails to be associated a certain times.

In some embodiments of the present invention, human matching-score function and associate people are defined in a greedy algorithm until the score is below a certain threshold.

Figure 7:
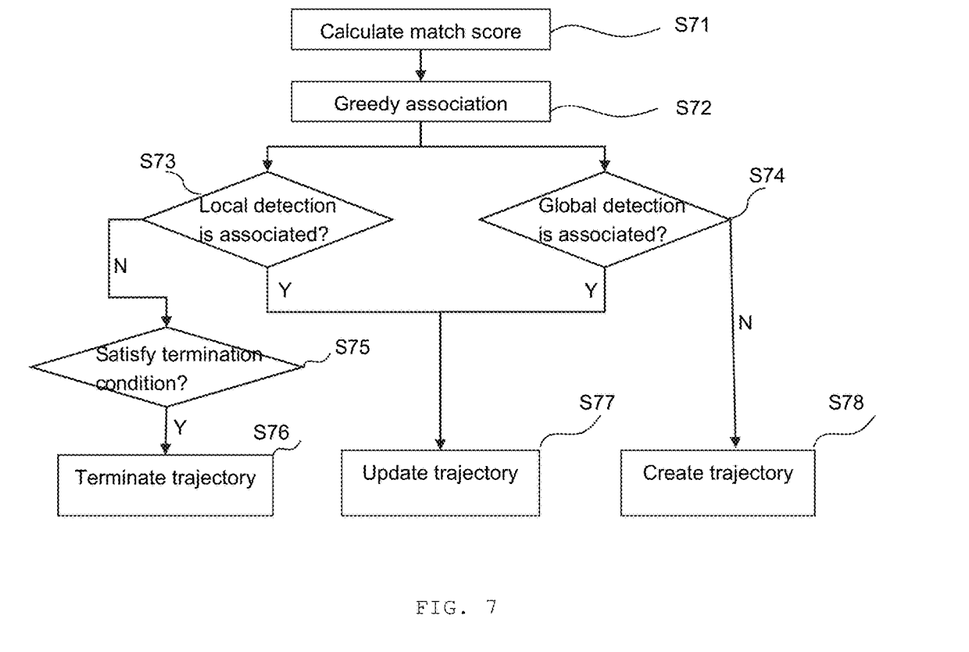
FIG. 7 is a flow diagram of the workflow of the data association unit according to an exemplary embodiment of the present invention.

The flow diagram of the workflow of data association unit is illustrated in FIG. 7; the detail of the corresponding steps is described as follows:

At step S71, the matching score is the measure of two image patches' similarity. Crop image patches of head-shoulder at both the positions of detection results of current frame and the newest positions of existed tracking results (trajectories). Take one image patch from detection results of current frame and the other from newest positions of existed trajectories to form an image patch pair. For each image patch pair, the matching score is calculated by a pixel-by-pixel template matching method or a color-histogram-based template matching method.

At step S72, association will be found in a greedy algorithm. First a matrix is built, whose columns are matching score, trajectory position and detection result position respectively, and each row is about an image patch pair. Then sort the matrix from high to low by matching score. The image patch pair with highest score in the matrix is considered as associated. Next, rows in conflict with the associated image patch pair are removed from the matrix immediately. We do the association in this process until all the scores are below an experimental threshold or the matrix is empty.

Either Step S73 or step S74 is performed according to the detection result's type; step S73 determines whether the local detection is associated or not, and step 74 determines whether the global detection is associated or not. If the determination result of step S73 or step S74 is successful, then step S73 or step S74 turns to step S77. If it fails, step S73 turns to step S75 and step S74 turns to step S78.

Step S75 determines whether the termination condition is satisfied or not. If success, turn to step S76.

Step S76 terminates an existed trajectory if it continuously fails to be associated a certain times. In some embodiments of the present invention, the experiential value is set to 4.

Step S77 updates trajectory position in current frame according to successful association results; and at step S78, unassociated global detection results on uniformly sampled frame can be used to initialize new trajectories.

Frame Sampling Unit

The frame sampling unit 405 selects sampled frames and determines ROIs to do local detection to verify or refine the motion estimation results. Note that the frame sampling unit won't run if global detection on uniformly sampled frames in a frame cell all fail.

For high-frequency videos, frame-to-frame change is slight. Motion estimation for trajectories is a good idea to save computation load. However, motion estimation between two global detection results is so coarse that it produces drifting, ID change or missing. Instead, we do local detection on frames selected by the frame sampling unit to verify or refine the motion estimation results.

That is, the whole frame cell is treated as an unverified-motion segment. If an object is successfully detected and associated in the predicted ROI of a frame selected by the frame sampling unit, the segment which starts from the very first frame of the frame cell to the said selected frame is will be reagard as a verified-motion segment. The residual frames now compose a new unverified-motion segment to be verified.

After data association of global detection results on the first frame of a frame cell, there are two kinds of trajectories: existing trajectory which is updated in step S77 and newly created trajectory which is generated by step S78.

With respect to the existing trajectory, in order to decide sampled frames in each frame cell, a selecting frame method could be predetermined according to the motion attributes of tracking object in specific application. However, more generally, a binary search method, or even a random select method can be adopted.

Figure 8:
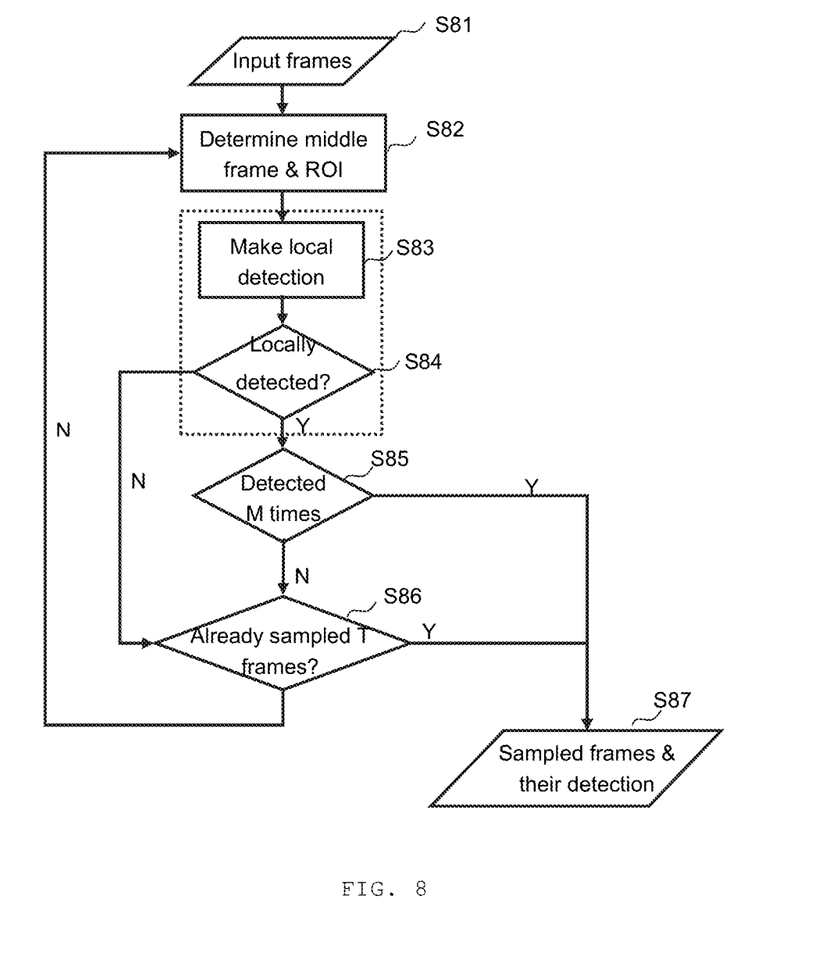
FIG. 8 is a flow diagram of the working principle of the frame sampling unit according to an exemplary embodiment of the present invention.

FIG. 8 is a flow diagram of the working principle of the frame sampling unit according to an exemplary embodiment of the present invention. The detailed steps will be described as follows:

At first, step S81 inputs the unverified-motion segment of frames.

Step S82 takes the whole frames of a frame cell as initial unveried-motion segment. Select the middle frame of the segment as a sampled frame, and deciding its region-of-interest (ROI).

Step S83 makes the local detection, wherein detecting on region-of-interest of selected middle frame by the local object detector. Then step S84 determines whether the object is locally detected or not. If not detected, take the left half of input frames as the new unverified-motion segment, and go to step S86. If success, turn to step S85. Wherein the left half of input frames are the frames starts from the very first frame to the current binary-sampled frame of the input frames.

Step S85 checks whether the total number of successfully detected times in the whole frame cell reach the predetermined M times (M≥1) or not. If not, take all the right frames of the selected frame in the frame cell as the unverified-motion segment, and go to step S86. Wherein the right half of frame cell are the frames starts from the current binary-sampled frame to the end of the frame cell. If yes, the "binary search" in this frame cell comes to the last step S87.

Step S86 determines whether the number of selected frames equals a predetermined threshold T; if yes, stop "binary search" and turn to step S87. If not, go to step S82.

Finally, step S87 outputs all the sampled frames and their detection results.

Wherein, the predicted search region for human is determined by motion estimation from historical results of the tracking person on both former frames and latter frames, and then ROI is generated by expanding the predicted region. And the middle frame of the input frames is the ceiling or round to half of the sum of the start frame timestamp and the end frame timestamp.

And in step S85 of the binary search method, parameter M relates to the number of frames N in a frame cell. It indicates how smallest the frame interval is for steady motion estimation. In some embodiments of the present invention, parameter M is 2 when N=50 for a 25 fps video. What's more, M is no more than T, and T should be no more than the ceiling of log2(N).

With respect to newly created trajectories, continuous frame k+1, k+2, . . . , k+S are all locally detected to verify the newly created trajectory is a true trajectory, and estimate an accurate speed for it. Wherein S is an experimental parameter and S≥1; k is the frame timestamp in whole input image sequences, and k≥1. Then with the known speed calculated within S frames, frame sampling could be done as the way of the existing trajectories.

Trajectory Estimation Unit

If trajectories on every frame are needed, motion estimation on those un-sampled frames is made. Given tracking results on uniformly sampled frames t and binary-sampled frames t* in a frame cell, trajectories (both positions and human sizes) of un-sampled frames and fail-associated frames are easy to fill in by motion estimation, such as linear interpolation. Wherein the fail-associated frames in the frame cell include both the first sampled frames and the second sampled frames which fail to be associated by the data association unit. Otherwise, trajectories on certain frames as output tracking information are enough.

Therefore, the trajectory estimation unit is optional depending on application requirements.

Compared to the prior art, the object detection and tracking system of the present invention has the advantage as follows:

less frame is to be made for detection. Only binary-sampled frames are to be detected. It strongly accelerates the tracking speed, making it over-realtime.

Motion estimation results on binary-sampled frames output by the frame sampling unit are verified or refined by local detection; the binary-sampled frames split image sequences into different sizes of steady motion, so motion estimation for un-sampled frames are accurate.

In summary, the object detection and tracking system of the present invention can achieve high tracking speed, meanwhile keep high accuracy.

Figure 9:
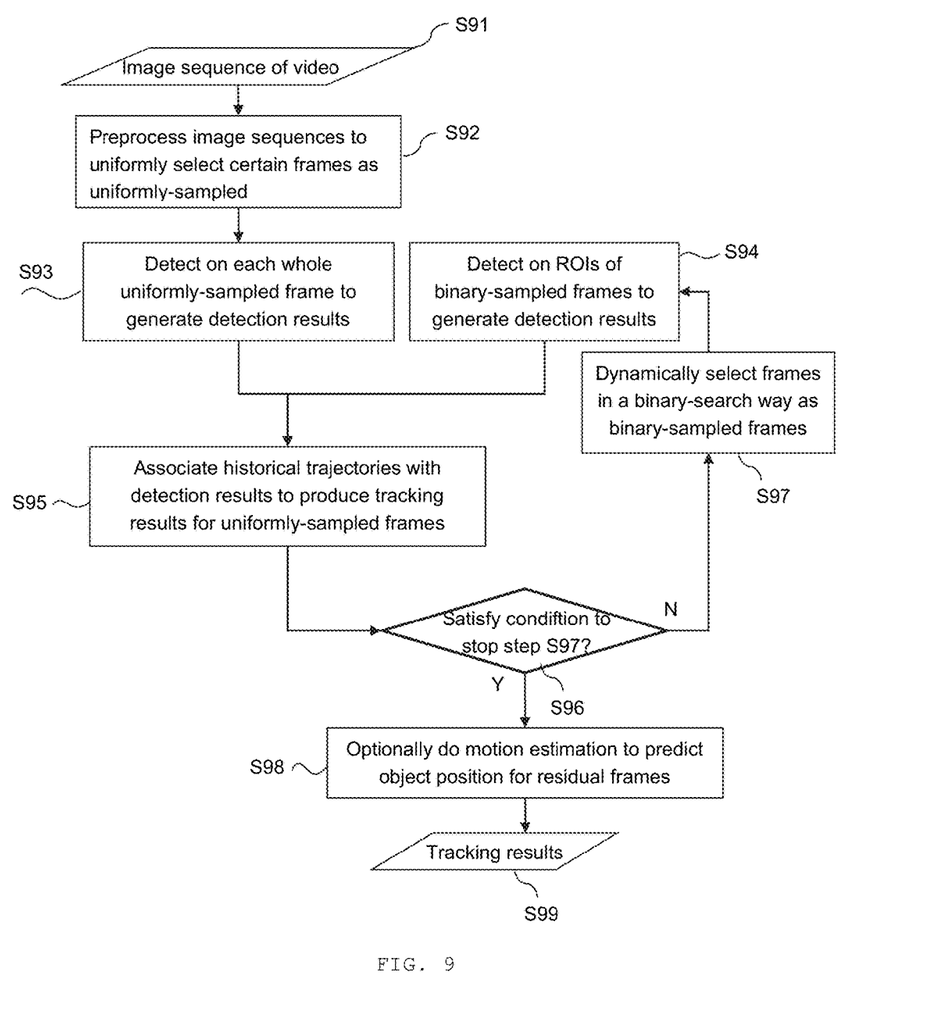
FIG. 9 illustrates the flow diagram of the object detection and tracking system according to an exemplary embodiment of the present invention.

FIG. 9 illustrates the flow diagram of the object detection and tracking system according to an exemplary embodiment of the present invention.

First, at step S91, input the image of sequence of video, then at turn to step S92.

Step S92 preprocesses image sequences to uniformly select certain frames as uniformly-sampled frames. In this step, preprocess unit uniformly selects sampled frames, dividing input image sequence into frame cells.

At step S93, for each frame cell, the global human detector detects on each whole uniformly-sampled frame to generate detection results. And at step S94, the local human detector detects on ROIs of binary-sampled frames to generate local detection results.

Step S95 associates historical trajectories with detection results to produce tracking results for uniformly-sampled frames and binary-sampled frames. In this step, the data association unit performs the corresponding function. The data association unit decides which global detection result guides the existed tracking results or creates new trajectories as tracking results. Meanwhile, the data association unit associates local detection results to existed trajectories. The step S93 and S95 are performed at first.

S96 decides whether the predefined conditions to stop selecting binary-sampled frames in S97 are satisfied or not. In an exemplary embodiment of the present invention, the predefined stop conditions including: i) the total number of successfully detected times in the whole frame cell reach predetermined times; or ii) the number of selected binary-sampled frames equals a predetermined threshold. If yes, turn to S98. If not, turn to S97.

Step S97 dynamically select frames in a binary-search way as binary-sampled frames by frame sampling unit. The frame sampling unit selects binary-sampled frames in a predetermined way and utilizes tracking results to decide ROI on the binary-sampled frames according to motion continuity. Then turn to step S94.

Next is an optional step S98. At step S98, the trajectory estimation unit makes motion estimation to predict object position for residual frames. That is, trajectories on the un-sampled frames and fail-associated frames are estimated by motion according to the existed tracking results. Wherein the fail-associated frames in the frame cell, include both the first sampled frames and the second sampled frames which fail to be associated by the data association unit.

Finally, step S99 obtains the tracking results.

To compare with the prior art, the MOTA score is used in the prior art to evaluate the tracking accuracy, wherein the MOTA score is composed of true negative rate, false positive rate, and ratio of identifier mismatches.

Table 1 illustrates the evaluation results about speed and accuracy between the present invention and the prior art. In table 1, according to the Eidgenössische Technische Hochschule Zürich's central dataset (ETHZ Central dataset) and the Technical University of Darmstadt's crossing dataset (TUD crossing dataset), it is can be seen that the speed of the present invention can achieve much more higher than the frame-by-frame tracking system of the prior art. Meanwhile, compared with the prior art, the accuracy of the present invention is almost kept.

TABLE 1

Evaluation Results

| Dataset | system | Accuracy (%) |
| --- | --- | --- |
| ETHZ Central | Prior art | 72.9 |
|  | Present invention | 65 |
| TUD crossing | Prior art | 84.3 |
|  | Present invention | 86 |

According to the system of the present invention, only a few frames are to be detected and the other frames are split into different size of steady motion segments in a binary way, and then the system of the present invention can be predicted accurately. The system can help to achieve high tracking speed with multi-persons in high-definition videos and gain high accuracy as well.

It is possible to carry out the method and system of the present invention in many ways. For example, it is possible to carry out the method and system of the present invention through software, hardware, firmware or any combination thereof. The above described order of the steps for the method is only intended to be illustrative, and the steps of the method of the present invention are not limited to the above specifically described order unless otherwise specifically stated. Besides, in some embodiments, the present invention may also be embodied as programs recorded in recording medium, including machine-readable instructions for implementing the method according to the present invention.

Although some specific embodiments of the present invention have been demonstrated in detail with examples, it should be understood by a person skilled in the art that the above examples are only intended to be illustrative but not to limit the scope of the present invention. It should be understood by a person skilled in the art that the above embodiments can be modified without departing from the scope and spirit of the present invention.

What is claimed is:

1. A multi-object detection and tracking system, comprising:
    a) preprocess unit which is configured to select a plurality of first sampled frames to divide a sequence of images into frame cells;
    b) global object detector which is configured to perform object detection on the whole image of the first sampled frames, and give out global detection results;
    c) frame sampling unit which is configured to select at least one second sampled frame in a frame cell;
    d) local object detector which is configured to perform object detection on the region-of-interest of the second sampled frames, and output local detection results;
    e) data association unit which is configured to align the global detection results and the local detection results with existed trajectories by object similarity.

2. The system of claim 1, wherein the first sampled frames are selected by uniformly sampling the sequence of images with a predetermined interval N, N≥1.

3. The system of claim 1, wherein the frame cell is composed of two of the first sampled frames and all the frames between them.

4. The system of claim 1, wherein, the frame cells are sequentially processed for object tracking.

5. The system of claim 1, wherein the global object detector and the local object detector are the same in terms of classifiers.

6. The system of claim 1, wherein the second sampled frames splitting each frame cell into different sizes of steady motion segments are determined according to the motion attributes of the tracking object.

7. The system of claim 1, wherein the second sampled frames split each frame cell into different sizes of steady motion segments according to a binary search method, further comprising:
    1) taking unverified-motion segment as input frames, when initialization, take the whole frame cell;
    2) selecting the middle frame of the input frames as the second sampled frame, and deciding its region-of-interest;
    3) using the local object detector to detect on region-of-interest of the selected middle frame, and outputting the local detection results;
    4) changing the unverified-motion segment and repeating search until meeting any predefined stop conditions.

8. The system of claim 7, wherein the unverified-motion segment is updated by the left half of the input frames when the local detection on the second sampled frame fails; otherwise, take all the right frames of the selected frame in the frame cell; wherein the left half of input frames are the frames starts from the first frame to the current second sampled frame of the input frames, and the right half of frame cell are the frames starts from the current second sampled frame to the end of the frame cell.

9. The system of claim 7, wherein the predefined stop conditions including:
    i) the total number of successfully detected times in the whole frame cell reach predetermined times; or
    ii) the number of selected frames equals a predetermined threshold.

10. The system of claim 7, wherein the middle frame of the input frames is the frame whose timestamp is ceiling or round to half of the sum of the start frame timestamp and the end frame timestamp.

11. The system of claim 7, wherein deciding the region-of-interest of the second sampled frame by expanding the motion-predicted region for existed tracking objects, according to historical tracking results on both former frames and latter frames.

12. The system of claim 1, further comprising a trajectory estimation unit which is configured to fill in trajectories for un-sampled frames and fail-associated frames in the frame cell, by interpolation with given tracking results of both the first and second sampled frames.

13. A multi-object detection and tracking method, comprising:
 a) selecting a plurality of first sampled frames to divide a sequence of images into frame cells;
 b) performing object detection on the whole image of the first sampled frames, and giving out global detection results;
 c) selecting at least one second sampled frame in a frame cell;
 d) performing object detection on the region-of-interest of the second sampled frames, and outputting local detection results;
 e) aligning the global detection results and the local detection results with existed trajectories by object similarity.

14. The method of claim 13, wherein, the first sampled frames are selected by uniformly sampling the sequence of images with a predetermined interval N, N≥1.

15. The method of claim 13, wherein the frame cell is composed of two of the first sampled frames and all the frames between them.

16. The method of claim 13, wherein the frame cells are sequentially processed for object tracking.

17. The method of claim 13, wherein the second sampled frames splitting each frame cell into different sizes of steady motion segments are determined according to the motion attributes of the tracking object.

18. The method of claim 13, wherein the second sampled frames split each frame cell into different sizes of steady motion segments according to a binary search method, further comprising:

1) taking unverified-motion segment as input frames, when initialization, take the whole frame cell;
 2) selecting the middle frame of the input frames as the second sampled frame, and deciding its region-of-interest;
 3) using a local object detector to detect on region-of-interest of the selected middle frame, and outputting the local detection results;
 4) changing the unverified-motion segment and repeating search until meeting any predefined stop conditions.

19. The method of claim 18, wherein the unverified-motion segment is updated by the left half of the input frames when the local detection on the second sampled frame fails; otherwise, take all the right frames of the selected frame in the frame cell; wherein the left half of input frames are the frames starts from the very first frame to the current second sampled frame of the input frames, and the right half of frame cell are the frames starts from the current second sampled frame to the end of the frame cell.

20. The method of claim 18, wherein the predefined stop conditions including:
 i) the total number of successfully detected times in the whole frame cell reach predetermined times; or
 ii) the number of selected frames equals a predetermined threshold.

21. The method of claim 18, wherein the middle frame of the input frames is the frame whose timestamp is ceiling or round to half of the sum of the start frame timestamp and the end frame timestamp.

22. The method of claim 18, wherein deciding the region-of-interest of the second sampled frame by expanding the motion-predicted region for existed tracking objects, according to historical tracking results on both former frames and latter frames.

23. The method of claim 13, further comprising filling in trajectories for un-sampled frames and fail-associated frames in the frame cell, by interpolation with given tracking results of both the first and second sampled frames.

\* \* \* \* \*